3,077,740
STABILIZATION OF CLAY SOILS AND
AGGREGATES—SO₄—PO₄
John B. Hemwall, Long Beach, Calif., assignor to The
Dow Chemical Company, Midland, Mich., a corporation of Delaware
No Drawing. Filed Jan. 2, 1962, Ser. No. 163,920
2 Claims. (Cl. 61—36)

This invention is concerned with the consolidation and stablization of argillaceous soils and clay-containing aggregates and is particularly directed to a method and composition embodying a mixture of phosphoric and sulfuric acids to accomplish such stabilization.

Many clay soils cause problems, for example, in the construction industry, because of their tendency to become plastic and flowable when wetted. Also, it is desirable in many parts of the world to use clay soils or clay-containing aggregates as building materials, as for example, in the adobe structures of the Southwestern United States and Mexico. Various materials have been added to clay soils and aggregates in an attempt to improve their water repellancy or to maintain the strength of the material when wetted.

It is an object of the present invention to provide a method and composition for stabilizing argillaceous soils and construction materials. It is a further object to provide stabilized argillaceous materials having improved strength when exposed to water. Yet another object is to provide stabilized argillaceous compositions employing inexpensive and readily available additaments. Other objects will become apparent from the following specification and claims.

In accordance with the present invention, it has been discovered that the incorporation in argillaceous soils of orthophosphoric acid and of sulfuric acid together provides a composition which may be compacted to produce a stabilized mass having significantly improved compressive strength as compared to untreated argillaceous soil. It is among the advantages of the invention that the argillaceous soil so treated retains its strength even when immersed in water.

The term "argillaceous soil" as used herein refers to soils containing at least 15 percent by weight of clay minerals and not more than 50 percent sand and is exclusive of organic soils, such as peat, of calcareous soils, that is, soils containing greater than 0.5 percent calcium carbonate, and of predominantly sandy soils, that is, soils containing more than 50 percent sand. The term "clay" as used herein refers to widely distributed colloidal earthy substances, plastic when moist, which are composed primarily of decomposed igneous and metamorphic rocks rich in the mineral feldspar, in the form of crystalline grains less than 0.002 millimeter in diameter, whose essential constituents are kaolin, montmorillonite and other hydrous silicates of alumina. For the purposes of the present invention, the clay, silt and sand content of the soil are determined by standard methods as described, for example, by Bouyoucos in Soil Science, volume 44, pages 245 and 246.

In carrying out the invention, the phosphoric acid and sulfuric acid are mixed together with the argillaceous soil or clay aggregate in any suitable fashion in proportions to give 0.1 to 7 equivalents of $H_2SO_4$ as $SO_4$ per mole of $H_3PO_4$, to give a pH of not less than 3 measured in a non-plastic aqueous slurry of the so-treated soil after compacting and curing at a relative humidity of 90 to 100 percent and at a temperature of 20° to 30° C. for six days, and to provide 0.1 to 5 percent elemental P as $H_3PO_4$ on a dry soil weight basis. Proportions to provide 0.5 to 5 percent P as $H_3PO_4$ are preferred. The phosphoric acid is added as orthophosphoric acid, as indicated previously, or as equivalent phosphoric pentoxide, pyrophosphoric acid, metaphosphoric acid or tetraphosphoric acid, which can be used as the source of orthophosphoric acid. Advantageously, a mixture of phosphoric and sulfuric acid is diluted with up to several volumes of water per volume of mixed acids to bring the soil or aggregates to optimum moisture content or less. In a preferred method of operation, a mixed acids solution is preferably diluted with several volumes of water and is sprayed on to the soil while the latter is stirred or otherwise mixed. Thereafter the treated soil is compacted by conventional means as by tamping, rolling, or the like. Following the mixing and compacting steps, it is desirable to maintain the treated soil in a moist but not soaked condition for a period of from about 1 to 6 days to provide for curing of the mixture with concurrent development of the desired strength properties.

In operations where the argillaceous soil or aggregate is excavated and treated, as for the preparation of sun-dried building material, the mixing of the acids can be carried out in conventional mixing equipment such as ribbon mixers, sand mullers, pug mills or the like. Thereafter the mixture of soil or aggregate and acids may be compacted, for example, by ramming or pressing in molds. Alternatively, where it is desired to stabilize argillaceous soil in place as in the preparation of dams or subsurfaces for road building, the mixed acids may be applied by spraying followed by a mixing operation, and the mixture compacted by the use of sheep's foot rollers and the like.

For the purposes of the invention, technical or by-product acids are more advantageously used for reasons of economy and availability wherein impurities, if any, are inert or are such as not to vitiate the effects of the added acids.

The amounts of phosphoric and sulfuric acids to be employed in accordance with the invention will vary somewhat within the ranges previously indicated, depending upon such factors as the nature and composition of the argillaceous soil or clay aggregate and the degree of strengthening required in a particular application. In general, the phosphoric acid is employed in the form of orthophosphoric acid in amount sufficient to provide, with sulfuric acid, a proportion of from about one mole of $H_3PO_4$ per 0.1 to 7 equivalents of $H_2SO_4$ as $SO_4$ and to provide 0.1 to 5 percent elemental P as $H_3PO_4$ on a dry soil weight basis. Furthermore, it is required that the amount of acids be a predetermined amount such that the treated soil after compacting and curing for six days at a relative humidity of 90 to 100 percent and at a temperature of 20 to 30° C. will have a pH of at least 3.0 when measured in a non-plastic aqueous slurry of such treated soil using a glass electrode assembly. In a particular instance, the acids requirements within the above limitations can be determined by a series of tests with varying amounts of acids on representative portions of the particular soil to be treated, for example, in accordance with the procedure outlined in Example 1 below.

The following examples describe completely representative specific embodiments of this invention and set forth the best mode contemplated by the inventor of carrying out the invention. The examples are not to be construed as limiting the invention other than as defined in the appended claims.

The following soils were used in the reported examples:

TABLE I

| Soil | Mechanical Analysis | | | pH | Organic Matter, percent |
|---|---|---|---|---|---|
| | Clay | Silt | Sand | | |
| F1 | 18 | 56 | 26 | 7.0 | 1.3 |
| F2 | 52 | 46 | 2 | 6.3 | 1.9 |
| M1 | 23 | 39 | 38 | 5.7 | 1.7 |
| B1 | 22 | 52 | 26 | 5.3 | 10.7 |
| Q1 | 23 | 38 | 39 | 5.9 | 32.2 |
| M2 | 42 | 36 | 22 | 6.3 | 2.4 |
| N1 | 32 | 24 | 44 | 7.4 | --------- |

*Example 1*

The following solutions were prepared:

(1) 5 g. 85% $H_3PO_4$ diluted to 20 ml. with distilled water.
(2) 5 g. 85% $H_3PO_4$ plus 2.17 g. conc. $H_2SO_4$ diluted to 20 ml. with distilled water.
(3) 5 g. 85% $H_3PO_4$ plus 4.34 g. conc. $H_2SO_4$ diluted to 20 ml. with distilled water.
(4) 5 g. 85% $H_3PO_4$ plus 6.51 g. conc. $H_2SO_4$ diluted to 20 ml. with distilled water.

The above solutions were sprayed into separate 200 gram samples of soil F1 and intimately mixed. Two approximately 90 grams subsamples and one approximately 15 gram subsample of each treatment were placed in tubular molds three centimeters in diameter. The samples were then compressed from both ends in the mold at a pressure of 740 p.s.i. The resulting soil cylinders were ejected from the molds and cured in a high humidity atmosphere (90–100 percent) at room temperature.

After six days' cure, the two larger samples were immersed in distilled water for 24 hours. After immersion, the samples were tested for their unconfined compressive strength (UCS) using the unconfined compression test apparatus, Model U–160, manufactured by Soiltest Inc.

After six days' cure, the smaller sample was crushed, made into a non-plastic slurry with distilled water and the pH of the slurry determined using a Beckman Model H–2 pH meter. The results of this experiment are shown below.

TABLE II

| Mmoles $H_3PO_4$ per 100 g. Soil | Meq. $H_2SO_4$ per 100 g. Soil | Eq. $H_2SO_4$/Mole $H_3PO_4$ | UCS (p.s.i.) | pH After 6 Days' Cure |
|---|---|---|---|---|
| 21.7 | 0 | — | 254 | 4.6 |
| 21.7 | 21.3 | 1 | 398 | 3.9 |
| 21.7 | 42.3 | 2 | 512 | 3.0 |

*Example 2*

The following solutions were prepared:

(1) 30 g. 85% $H_3PO_4$ diluted to 60 ml. with distilled water.
(2) 30 g. 85% $H_3PO_4$ plus 13 g. conc. $H_2SO_4$ diluted to 60 ml. with distilled water.

10-Ml. aliquots of solutions 1 and 2 were each diluted to 25 ml. with water and sprayed with intimate mixing into 200 grams of soil F2.

10-Ml. aliquots of solutions 1 and 2 were each diluted to 32 ml. with water and sprayed with intimate mixing into 200 grams of soil M1.

Duplicate plugs were made from each of the above treatments, cured and tested as in Example 1. The results are shown below.

TABLE III

| Soil | Treated With Soln. No. | Mmoles $H_3PO_4$ per 100 g. Soil | Meq. $H_2SO_4$ per 100 g. Soil | Eq. $H_2SO_4$/Mole $H_3PO_4$ | UCS (p.s.i.) | pH After 6 Days' Cure |
|---|---|---|---|---|---|---|
| F2 | 1 | 21.7 | 0 | --------- | 98 | 4.5 |
| F2 | 2 | 21.7 | 21.7 | 1 | 193 | 3.6 |
| M1 | 1 | 21.7 | 0 | --------- | 94 | 4.1 |
| M1 | 2 | 21.7 | 21.7 | 1 | 201 | 3.1 |

*Example 3*

The following solutions were prepared:

(1) 5 g. 85% $H_3PO_4$ diluted to 22 ml. with distilled water.
(2) 5 g. 85% $H_3PO_4$ plus 1.5 g. $H_2SO_4$ diluted to 22 ml. with distilled water.
(3) 5 g. 85% $H_3PO_4$ plus 2.0 g. $H_2SO_4$ diluted to 22 ml. with distilled water.
(4) 5 g. 85% $H_3PO_4$ plus 2.75 g. $H_2SO_4$ diluted to 22 ml. with distilled water.
(5) 5 g. 85% $H_3PO_4$ plus 3.0 g. $H_2SO_4$ diluted to 22 ml. with distilled water.
(6) 5 g. 85% $H_3PO_4$ plus 3.25 g. $H_2SO_4$ diluted to 22 ml. with distilled water.
(7) 5 g. 85% $H_3PO_4$ plus 3.75 g. $H_2SO_4$ diluted to 22 ml. with distilled water.

The above solutions were sprayed into separate 200 gram samples of soil F1 and intimately mixed. Plugs were made from each of the above treatments, cured and tested as in Example 1. The results are shown below.

TABLE IV

| Treated With Soln. No. | Mmoles $H_3PO_4$ per 100 g. Soil | Meq. $H_2SO_4$ per 100 g. Soil | Eq. $H_2SO_4$/Mole $H_3PO_4$ | UCS (p.s.i.) | pH After 6 Days' Cure |
|---|---|---|---|---|---|
| 1 | 21.7 | --------- | --------- | 182 | 4.3 |
| 2 | 21.7 | 15.0 | 0.69 | 267 | 3.9 |
| 3 | 21.7 | 20.0 | 0.92 | 244 | 3.7 |
| 4 | 21.7 | 27.5 | 1.27 | 303 | 3.3 |
| 5 | 21.7 | 30.0 | 1.38 | 336 | 3.2 |
| 6 | 21.7 | 32.5 | 1.50 | 343 | 3.1 |
| 7 | 21.7 | 37.5 | 1.73 | 366 | 3.0 |

*Example 4*

The following solutions were prepared:

(1) 5 g. 85% $H_3PO_4$ diluted to 50 ml. with distilled water.
(2) 5 g. 85% $H_3PO_4$ plus 1.63 g. $H_2SO_4$ diluted to 50 ml. with distilled water.
(3) 5 g. 85% $H_3PO_4$ plus 3.25 g. $H_2SO_4$ diluted to 50 ml. with distilled water.
(4) 5 g. 85% $H_3PO_4$ diluted to 55 ml. with distilled water.
(5) 5 g. 85% $H_3PO_4$ plus 3.25 g. $H_2SO_4$ diluted to 55 ml. with distilled water.
(6) 5 g. 85% $H_3PO_4$ plus 6.50 g. $H_2SO_4$ diluted to 55 ml. with distilled water.
(7) 5 g. 85% $H_3PO_4$ diluted to 32 ml. with distilled water.
(8) 5 g. 85% $H_3PO_4$ plus 1.63 g. $H_2SO_4$ diluted to 32 ml. with distilled water.
(9) 5 g. 85% $H_3PO_4$ diluted to 28 ml. with distilled water.
(10) 5 g. 85% $H_3PO_4$ plus 1.63 g. $H_2SO_4$ diluted to 28 ml. with distilled water.
(11) 5 g. 85% $H_3PO_4$ plus 3.25 g. $H_2SO_4$ diluted to 28 ml. with distilled water.

Solutions 1 through 3 were sprayed into separate 200 gram samples of soil B1 and intimately mixed. Solutions 4 through 6, 7 through 8, and 9 through 11 were similarly added to soils Q1, M2 and N1, respectively.

Plugs were made from each of the above treatments, cured, and tested as in Example 1. The results are shown below.

TABLE V

| Soil | Treated With Soln. No. | Mmoles $H_3PO_4$ per 100 g. Soil | Meq. $H_2SO_4$/ per 100 g. Soil | Eq. $H_2SO_4$ Mole $H_3PO_4$ | UCS (p.s.i.) | pH After 6 Days' Cure |
|---|---|---|---|---|---|---|
| B1 | 1 | 21.7 | | | 71 | 4.3 |
| B1 | 2 | 21.7 | 16.3 | 0.75 | 79 | 3.7 |
| B1 | 3 | 21.7 | 32.5 | 1.50 | 96 | 3.2 |
| Q1 | 4 | 21.7 | | | 41 | 5.0 |
| Q1 | 5 | 21.7 | 32.5 | 1.50 | 52 | 4.3 |
| Q1 | 6 | 21.7 | 65.0 | 3.00 | 69 | 3.6 |
| M2 | 7 | 21.7 | | | 106 | 4.0 |
| M2 | 8 | 21.7 | 16.3 | 0.75 | 136 | 3.1 |
| N1 | 9 | 21.7 | | | 104 | 4.7 |
| N1 | 10 | 21.7 | 16.3 | 0.75 | 137 | 3.9 |
| N1 | 11 | 21.7 | 32.5 | 1.50 | 121 | 3.0 |

What is claimed is:

1. A method for stabilizing an argillaceous soil containing at least 15 weight percent clay and not more than 50 percent sand by distributing throughout said soil a mixture of sulfuric acid and orthophosphoric acid to provide a proportion of from 0.1 to 5 weight percent of phosphorus as phosphoric acid on a dry soil weight basis, said mixture of acids having from 0.1 to 7 equivalents of sulfate group per molar equivalent of phosphate group and to give a pH not less than 3.0 measured in a nonplastic aqueous slurry of the so-treated soil when compacted and cured at a relatively humidity of 90 to 100 percent and at a temperature of 20° to 30° C. for six days, and compacting and curing said compacted soil at a relatively humidity of 90 to 100 percent and at a temperature of 20° to 30° C. for six days.

2. A mixture of an argillaceous soil having at least 15 weight percent clay and not more than 50 percent sand with sulfuric and phosphoric acids, said mixture having a proportion of from 0.1 to 5 weight percent of phosphorus as phosphoric acid on a dry soil weight basis, the acid proportions of which provide from 0.1 to 7 equivalents of sulfate group per molar equivalent of phosphate group and give a pH not less than 3.0 when compacted and cured at a relative humidity of 90 to 100 percent and at a temperature of 20° to 30° C. for six days.

No references cited.